United States Patent Office 3,487,055
Patented Dec. 30, 1969

3,487,055
HYDROCARBON COPOLYMERS CONTAINING 2(4-CYCLOHEXENYL)[2,2,1]BICYCLONEPT-5-ENE
Ernest E. Fauser, Cuyahoga Falls, Ohio, assignor to The Goodyear Tire & Rubber Company, Akron, Ohio, a corporation of Ohio
No Drawing. Filed Dec. 2, 1966, Ser. No. 598,626
Int. Cl. C08f *19/00, 1/42*
U.S. Cl. 260—79.5        9 Claims

ABSTRACT OF THE DISCLOSURE

A novel hydrocarbon polymer which may be sulfur-cured to form a useful elastomeric material consisting essentially of units of ethylene, an alpha olefin of the structure R—CH=CH, where R is an alkyl radical having 1 to 4 carbon atoms, and 2(4-cyclohexenyl)[2,2,1]bicyclohept-5-ene, and which may be prepared by polymerizing a mixture comprising ethylene, an alpha olefin of the structure R—CH=CH$_2$, where R is an alkyl radical having 1 to 4 carbon atoms and 2(4-cyclohexenyl)[2,2,1]bicyclohept-5-ene, in the presence of a catalyst prepared by mixing a compound selected from the group consisting of vanadium tetrachloride, vanadium oxytrichloride, vanadium acetylacetonate, and vanadium tri-n-butoxyvanadate, and at least one compound selected from the group consisting of $R_3Al$, $R_2AlX$, $RAlX_2$, and $Al_2R_3X_3$, where R is an alkyl radical having from 1 to 12 carbon atoms and X is a chlorine or a bromine radical.

---

This invention relates to new hydrocarbon polymers. In particular, this invention relates to hydrocarbon polymers of ethylene, another alpha olefin having one carbon-to-carbon double bond and a non-conjugated diolefin. More particularly, the invention relates to such hydrocarbon polymers which can be sulfur cured to form elastomeric materials and to a method of preparing such polymers.

Olefinic hydrocarbons having single carbon-to-carbon double bonds, particularly alpha olefins such as ethylene and propylene, can be copolymerized to form useful polymers which can have rubberlike properties. However, polymers formed from such olefins do not have ethylenic unsaturation and thus cannot be cured to form elastomeric materials by methods such as sulfur curing, which are normally used for curing natural and synthetic rubbers. One method for preparing polymers of alpha olefins having single carbon-to-carbon double bonds which can be sulfur-cured is to incorporate various diolefin units therein. However, diolefins often polymerize slowly, inefficiently or not at all with the various alpha olefins.

Therefore, it is an object of this invention to provide a new sulfur-curable polymeric material. It is a further object to provide a new hydrocarbon elastomer and a method of preparing the said elastomer.

In accordance with this invention it was found unexpectedly that a polymer capable of being sulfur cured comprises a polymer consisting essentially of units derived from ethylene, at least one alpha olefin having the structure R—CH=CH$_2$, where R is an alkyl radical having from 1 to 4 carbon atoms, and 2(4-cyclohexenyl)[2,2,1]bicyclohept-5-ene.

It was particularly discovered that a polymer capable of being sulfur cured to form an elastomeric material comprises a polymer consisting essentially of from about 20 to about 73 percent by weight units derived from ethylene, from about 25 to about 79 percent by weight units derived from an alpha olefin having the structure R—CH=CH$_2$, where R is an alkyl radical having from 1 to 4 carbon atoms, and from about 1.5 to about 17 percent by weight units derived from 2(4-cyclohexenyl)[2,2,1]bicyclohept-5-ene based on 100 percent by weight of the polymer. Such a polymer usually has an iodine number of from about 2 to about 25.

Various alpha olefins having the structure R—CH=CH$_2$ can be used in the preparation of the polymer of this invention. Representative examples of the alpha olefins are alpha olefins having single carbon to-carbon double bonds and from 3 to 6 carbon atoms such as propylene, 1-butene, 1-pentene and 1-hexene.

In the practice of this invention, the polymer which can be sulfur cured is formed by polymerizing a mixture comprising ethylene, an alpha olefin having the structure R—CH=CH$_2$, where R is an alkyl radical having from 1 to 4 carbon atoms, and 2(4-cyclohexenyl)[2,2,1]bicyclohept-5-ene in the presence of a coordination catalyst.

A suitable coordination catalyst is prepared by mixing at least one vanadium compound selected from the group consisting of vanadium tetrachloride, vanadium oxytrichloride, vanadium acetylacetonate and vanadium tri-n-butoxyvanadate and at least one organoaluminum compound selected from the group consisting of $R_3Al$, $R_2AlX$, $RAlX_2$, and $Al_2R_3X_3$ where R is an alkyl radical having from 1 to 12 carbon atoms such as a methyl, ethyl, isopropyl, n-propyl, isobutyl, isoamyl, isohexyl, heptyl, octyl, nonyl, decyl, undecyl, or dodecyl radical and X is a chlorine or a bromine radical. The generally preferred organoaluminum compounds are aluminum triisobutyl, aluminum sesquichloride and diethyl aluminum chloride.

The catalysts of this invention are prepared by mixing the components by well-known techniques. No particular order of mixing is required. The catalysts may be prepared by the "preformed" or "in-situ" techniques. By the preform method the catalyst components are mixed together prior to exposure of either component to the monomer to be polymerized. The in-situ method consists of adding the catalyst components to the monomer separately and is usually the preferred method. The catalyst components may be mixed either as pure compounds, or as suspensions or solutions in liquids which do not adversely affect the polymerization.

The amount of catalyst employed in the polymerizations of this invention may be varied over wide concentrations. Of course, a catalytic amount of the catalyst must be employed to cause polymerization of the monomer. The optimum amount of catalyst depends on a number of factors such as temperature, reactants used, purity of reactants, reaction times desired and the like. Those skilled in the art will readily determine the optimum catalytic ranges. While there is no maximum catalytic level, successful polymerizations have been conducted wherein the amount of total catalyst employed has ranged from about 0.04 to about 4 parts by weight per 100 parts by weight of monomer employed, although a range of from about 0.1 to about 1.5 is usually desirable, and a range of from about 0.2 to about 1.0 is usually more suitable. The term, total catalyst, is meant to include the weight of both the organoaluminum and the vanadium compounds.

In the catalyst composition the molar ratios of the organoaluminum compounds to the vanadium compounds may be varied over the range of from about 2 to about 15 or higher. However, a mol ratio of about 3 to about 10 is usually preferred. It will be recognized by those skilled in the art that the optimum molar ratio of the catalyst components may vary somewhat with the use of particular combinations of the catalyst components, the monomer being polymerized and the polymerization conditions.

The polymerizations of this invention may be conducted in solution or in bulk. When the polymerization is carried out in solution, solvents which do not adversely affect the polymerization are desired. Representative of useful solvents are liquid aromatic hydrocarbons such as benzene and toluene; hydrogenated aromatic hydrocarbons such as tetralin; liquid aliphatic hydrocarbons such as pentane, isopentane, neopentane, heptane, hexane, 2,2,4-trimethyl pentane, petroleum ether, octane, and decane; liquid cycloaliphatic hydrocarbons such as cyclopentane, cyclohexane, methyl cyclohexane, decalin, and cyclooctane; and halogenated liquid aliphatic hydrocarbons such as tetrachloroethylene. Mixtures of such solvents may also be used.

Temperatures at which the polymerization reaction is carried out can be varied over a wide range. Usually the temperature can be varied from extremely low temperatures such as about —20° C. up to higher temperatures such as about 40° C. It is generally preferred, however, to conduct the reaction at a temperature in the range of from about —10° C. to about 20° C. The pressure at which the polymerization is carried out can also be varied over a wide range. The reaction can be conducted at atmospheric pressure or, if desired, it can be carried out at subatmospheric pressure or super-atmospheric pressure. Generally a satisfactory polymerization is obtained when the reaction is carried out at about autogenous pressure developed by the reactants under the operating conditions used.

The polymerization time will vary and can range from a few minutes to 24 hours or more, depending upon the polymerization conditions and the degree and extent of polymerization desired.

The polymerization reaction may be carried out as a batch or as a continuous process. In performing the polymerizations of this invention, the introduction of the monomer, catalyst, and solvent, when a solvent is employed, can each be made to the reaction zone alternately, intermittently, and/or continuously.

The polymers prepared according to this invention are rubbery in nature and may be cured to form useful elastomeric materials. The polymers may be cured by the methods and procedures known to those skilled in the art. In particular, the polymers can be cured with sulfur.

The polymers of this invention are useful in preparing rubbery, elastomeric articles. Some of the many articles in which these polymers may be employed are coated and molded articles such as tires, inner tubes, industrial products such as tubes and belts, and various coated fabrics.

The following illustrative examples are set forth to further exemplify the objects and advantages of the invention. The parts and percentages are by weight unless otherwise indicated.

EXAMPLE 1

A suitable reactor equipped with stirrer, thermocouple well and gas inlet and outlet tubes, and charged under an inert atmosphere of dry nitrogen with 21,740 grams of benzene which had been dried and purified by passage through a column of silica gel. This mixture was purged for 15 minutes with nitrogen at a rate of about 10 liters of nitrogen per minute. The benzene was then stirred and cooled to about 5° C. Agitation of the mixture was continued and ethylene and propylene were bubbled through the mixture at rates of 11 liters of ethylene and 11 liters of propylene per minute at atmospheric pressure. The ethylene and propylene had been pretreated by passage through a column of molecular sieves. After about 15 minutes the benzene in the reactor was substantially saturated with the ethylene and propylene. While continuing to add the ethylene and propylene, 100 milliliters of a 1.25 molar solution of aluminum sesquichloride in benzene was added to the reactor followed by adding 75 milliliters of a 0.33 molar solution of vanadium oxytrichloride in benzene at 6 minute intervals in 5 increments of 10 milliliters each, followed by a sixth increment of 15 milliliters while continuously agitating the mixture in the reactor and adding the ethylene and propylene. Also, after the addition of the aluminum sesquichloride, 238 grams of 2(4-cyclohexenyl)[2,2,1]bicyclohept-5-ene was added to the mixture at 5 minute intervals in 45, 40, 35, 30, 25, 20, 10 and 5 milliliter increments. The 2(4-cyclohexenyl)[2,2,1] bicyclohept-5-ene had a boiling point of 114° C. at a reduced pressure of 15 millimeters of mercury. The reaction mixture temperature increased to about 32° C. while the ethylene and propylene were absorbed into the mixture very rapidly. After each addition of the vanadium oxytrichloride solution the reaction mixture turned a blue violet color, which blue violet color gradually faded to a clear solution until the next vanadium oxytrichloride addition. The mixture in the reactor became steadily more viscous as the reaction proceeded. After 45 minutes the addition of ethylene and propylene was discontinued and polymerization reaction was stopped by deactivating the catalyst with about 100 milliliters of isopropyl alcohol. The resulting polymeric material was coagulated by adding about 12 liters of isopropyl alcohol containing 15 grams of 2,6-ditertiary butyl cresol to the mixture. The coagulated material was resuspended in isopropyl alcohol for 24 hours and then dried under a reduced pressure of about 25 milliliters of mercury at about 50° C. for about 16 hours. A yield of 1315 grams of an elastomeric polymer containing 26 percent propylene by weight and having an iodine number of 19.8 was obtained.

Twenty parts of the polymer were mixed on a rubber roll mill with 1 part zinc oxide, 0.3 part tetramethyl thiuram monosulfide and 0.25 part sulfur. A portion of this compound polymer was cured by heating for 45 minutes at 160° C. The cured compounded polymer was elastomeric and had a swell volume of about 324 percent as determined by measuring the volumes of toluene imbibed per volume of sample of the vulcanized polymer under equilibrium conditions at 25° C.

Another portion of 100 parts of the polymer was mixed on a rubber roll mill with 80 parts of ISAF carbon black, 50 parts Circosol 4240 (obtained from the Sun Oil Company), 5 parts zinc oxide, 1.5 parts tetramethyl thiuram monosulfide, 1.5 parts mercaptobenzothiazol, 0.5 part of stearic acid and 1.25 parts sulfur. Samples of the compounded polymer were cured for various periods of time at 150° C. These cured samples were tested using conventional rubber testing procedures with the following results:

| Curing time (minutes) | Elongation (percent) | Tensile strength (lbs./sq. inch) |
| --- | --- | --- |
| 10 | 530 | 50 |
| 20 | 730 | 1,150 |
| 40 | 610 | 2,100 |
| 80 | 515 | 2,350 |

EXAMPLE 2

A suitable reactor was fitted with a stirrer, thermocouple well, and gas inlet and outlet tubes, and charged under an inert atmosphere of dry nitrogen with 704 grams of benzene. The benzene had been dried and purified by passage through a column of silica gel. The resulting benzene in the reactor was purged for 15 minutes with nitrogen at a rate of 1.5 liters of nitrogen per minute. The benzene was stirred and cooled to about 5° C. Agitation was continued and ethylene and propylene were bubbled through the mixture at rates of 960 cubic centimeters of ethylene and 640 cubic centimeters of propylene per minute at atmospheric pressure. The ethylene and propylene had been pretreated by passage through a column of molecular sieves. After about 15 minutes the benzene in the reactor was substantially saturated with ethylene and propylene. While continuing to add the ethylene and propylene, 5 milliliters of a 0.825 molar solution of aluminum sesquichloride in benzene was added to the reactor followed by adding 3 milliliters of a 0.33 molar solution of vanadium oxytrichloride in benzene in increments of 0.5 milliliter at 5 minute intervals while continuously agitating the mixture in the reactor and adding the ethylene and propylene. Also, after the addition of the aluminum sesquichloride, 5 grams of 2(4-cyclohexenyl)[2,2,1] bicyclohept-5-ene was added to the mixture at 5 minute intervals in 1 gram increments. The temperature of the reaction mixture increased to 32° C. while the ethylene and propylene were absorbed very rapidly. As the reaction proceeded the mixture became steadily more viscous. The polymerization was stopped by deactivating the catalyst with about 5 milliliters of isopropyl alcohol after 30 minutes and the addition of ethylene and propylene was discontinued. The resulting polymeric material was coagulated by adding about 800 milliliters of isopropyl alcohol containing 1 gram of 2,6-dietertiary butyl cresol to the reactor. The coagulated material was resuspended in isopropyl alcohol for 24 hours and then dried under a reduced pressure of about 25 millimeters of mercury at about 50° C. for about 16 hours. A yield of 64 grams of an elastomeric polymer containing 38 percent propylene by weight and having an iodine number of 9.4 was obtained.

Twenty parts of the polymer were compounded on a rubber roll mill with 1 part of zinc oxide, 0.3 part tetramethyl thiuram monosulfide and 0.25 part sulfur. The compounds polymer was cured by heating for 45 minutes at 160° C. The cured compounded polymer was elastomeric and had a swell volume of about 328 percent as determined by measuring the volumes of toluene imbibed per volume of a sample of the vulcanized polymer under equilibrium conditions at 25° C. Generally, the swell volume is a measure of the extent of vulcanization. A well-cured ethylene-propylene elastomer generally has a swell volume of 300 to 400 percent.

EXAMPLE 3

A polymerization was conducted according to the method of Example 2 with the following changes: as a diluent 544 grams of heptane were used instead of benzene. A yield of 43 grams of an elastomeric polymer containing 31 percent propylene by weight and having an iodine number of 11.9 was obtained.

Twenty parts of the polymer were compounded on a rubber roll mill with one part of zinc oxide, 0.3 part of tetramethyl thiuram monosulfide and 0.25 part of sulfur. The compounded polymer was cured by heating for 45 minutes at 160° C. The cured compounded polymer was elastomeric and had a swell voume of about 300% as determined by measuring the volumes of toluene imbibed per volume of a sample of the vulcanized polymer under equilibrium conditions at 25° C.

EXAMPLE 4

A polymerization was conducted according to the method of Example 2 with the exception that the 2(4-cyclohexyl)[2,2,1]bicyclohept-5-ene was added as one increment at the start of the polymerization and that as a second catalyst component, 9 milliliters of a 0.1 molar solution of vanadium tetrachloride were used instead of the 3 milliliters of a 0.33 molar solution of vanadium oxytrichloride. A yield of 56 grams of an elastomeric polymer containing 38 percent propylene by weight and having an iodine number of 12.7 was obtained.

Twenty parts of the polymer were compounded on a rubber roll mill with one part of zinc oxide, 0.3 part of tetramethyl thiuram monosulfide and 0.25 part of sulfur. The compounded polymer was cured by heating for 45 minutes at 160° C. The cured compounded polymer was elastomeric and had a swell volume of about 680 percent as determined by measuring the values of toluene imbibed per volume of a sample of the vulcanized polymer under equilibrium conditions at 25° C.

While certain representative embodiments and details have been shown for the purpose of illustrating the invention, it will be apparent to those skilled in this art that various changes and modifications may be made therein without departing from the spirit or scope of the invention.

What is claimed is:

1. A polymer consisting essentially of from about 20 to about 73 percent by weight of units derived from ethylene, from about 25 to about 79 percent by weight of units derived from an alpha olefin having the structure of $R-CH=CH_2$, where R is an alkyl radical having from 1 to 4 carbon atoms, and from about 1.5 to about 17 percent by weight of units derived from 2(4-cyclohexenyl)[2,2,1]bicyclohept-5-ene based on 100 percent by weight of the polymer.

2. A polymer according to claim 1 wherein the alpha olefin having the structure $R-CH=CH_2$ is selected from the group consisting of propylene, 1-butene, 1-pentene and 1-hexene.

3. A polymer according to claim 2 wherein the said alpha olefin is a propylene.

4. A polymer according to claim 4 wherein the polymer has an iodine number of from about 2 to about 25.

5. A polymer according to claim 3 wherein the polymer has been sulfur-cured to an elastomeric material.

6. A method of forming the polymer according to claim 1 comprising polymerizing a mixture consisting essentially of ethylene, at least one alpha olefin having the structure $R-CH=CH_2$, where R is an alkyl radical having from 1 to 4 carbon atoms, and 2(4-cyclohexenyl) [2,2,1]bicyclohept-5-ene, in the presence of a catalyst prepared by mixing at least one vanadium compound selected from the group consisting of vanadium tetrachloride, vanadium oxytrichloride, vanadium acetylacetonate and vanadium tri-n-butoxyvanadate and at least one organoaluminum compound selected from the group consisting of compounds having the structure $R_3Al$, $R_2AlX$, $RAlX_2$ and $Al_2R_3X_3$ where R is an alkyl radical having from 1 to 12 carbon atoms and X is a chlorine or a bromine radical.

7. A method according to claim 6 wherein the catalyst is prepared by mixing vanadium oxytrichloride and aluminum sesquichloride.

8. A method of forming the polymer according to claim 3 comprising polymerizing a mixture consisting essentially of ethylene, propylene and 2(4-cyclohexenyl)[2,2,1] bicyclohept-5-ene, in the presence of a catalyst prepared by mixing at least one vanadium compound selected from the group consisting of vanadium tetrachloride, vanadium oxytrichloride, vanadium acetylacetonate and vanadium tri-n-butoxyvanadate and at least one organoaluminum compound selected from the group consisting of compounds having the structure $R_3Al$, $R_2AlX$, $RAlX_2$ and $Al_2R_3X_3$ where R is an alkyl radical having from 1 to 12 carbon atoms and X is a chlorine or a bromine radical.

9. A method according to claim 8 wherein the polymerization is conducted in the presence of benzene as a diluent and wherein the catalyst is prepared by mixing vanadium oxytrichloride and aluminum sesquichloride.

References Cited

Chemical Abstracts, vol. 63:18423g, "Linear unsaturated alkene copolymers."

Chemical Abstracts, vol. 65:13923e, "Ethylene-propylene-5-(3'-cyclohexenyl)-2-norbornene elastomeric terpolymers."

Chemical Abstracts, vol. 65:10688d, "Olefin polymerization catalysts."

JOSEPH L. SCHOFER, Primary Examiner

R. S. BENJAMIN, Assistant Examiner

U.S. Cl. X.R.

260—80.78

PO-1050
(5/69)

UNITED STATES PATENT OFFICE
CERTIFICATE OF CORRECTION

Patent No. 3,487,055      Dated December 30, 1969

Inventor(s) Ernest E. Fauser

It is certified that error appears in the above-identified patent and that said Letters Patent are hereby corrected as shown below:

In the title: "BICYCLONEPT-" should read -- BICYCLOHEPT- --;

Column 5, line 44, "voume" should read -- volume -- ;

Column 6, line 19 (Claim 4), "according to claim 4" should read
-- according to claim 3 --.

SIGNED AND
SEALED
SEP 8 - 1970

(SEAL)
Attest:

Edward M. Fletcher, Jr.
Attesting Officer

WILLIAM E. SCHUYLER, JR.
Commissioner of Patents